(12) United States Patent
Hopkins et al.

(10) Patent No.: US 6,676,779 B2
(45) Date of Patent: Jan. 13, 2004

(54) AIR AND MOISTURE BARRIER LAMINATE APPARATUS

(75) Inventors: John R. Hopkins, Denver, CO (US); Max Barajas, Engelwood, CO (US)

(73) Assignee: Protecto Wrap Company, Denver, CO (US)

( * ) Notice: Subject to any disclaimer, the term of this patent is extended or adjusted under 35 U.S.C. 154(b) by 90 days.

(21) Appl. No.: 10/103,047

(22) Filed: Mar. 20, 2002

(65) Prior Publication Data

US 2003/0178121 A1 Sep. 25, 2003

(51) Int. Cl.[7] .............................................. B32B 31/04
(52) U.S. Cl. ........................ 156/71; 156/289; 156/510; 156/555; 156/582
(58) Field of Search .......................... 156/71, 250, 259, 156/289, 510, 555, 574, 580, 581, 582, 583.1

(56) References Cited

U.S. PATENT DOCUMENTS

| | | | |
|---|---|---|---|
| 4,557,774 A | 12/1985 | Hoopengardner | 156/71 |
| 4,775,567 A | 10/1988 | Harkness | 428/40 |
| 4,849,267 A | 7/1989 | Ward et al. | 428/41 |
| 5,091,235 A | 2/1992 | Vergnano | 428/192 |
| 5,218,793 A | 6/1993 | Ball | 52/62 |
| 5,374,477 A | * 12/1994 | Lawless et al. | 428/317.3 |
| 5,580,630 A | * 12/1996 | Byrd | 428/47 |

* cited by examiner

*Primary Examiner*—James Sells
(74) *Attorney, Agent, or Firm*—Marsh Fischmann & Breyfogle LLP (57) ABSTRACT

An apparatus for producing an air and moisture barrier laminate for sealing the interface between a sill plate and a foundation wall. The resulting laminate includes a compressible spacer material for placement between the top of a foundation wall and the bottom of a sill plate upon construction of a framed structure. Interconnected to a surface of the spacer material is an adhesive layer that may be selectively adhered to the foundation wall's top surface. The adhesive layer is operative to both securely attach the spacer material to the foundation wall to facilitate placement of the sill plate and to seal voids between the spacer material and the foundation wall. In a further embodiment, the laminate contains a second adhesive layer to seal the interface between the side surfaces of the foundation wall and the sill plate.

32 Claims, 6 Drawing Sheets

AIR AND MOISTURE BARRIER LAMINATE APPARATUS

FIELD OF THE INVENTION

The present invention relates broadly to building materials used in new construction. More particularly the invention relates to an apparatus and process for making a laminate that provides an air and moisture barrier for framed structures by sealing the vertical and horizontal interface surfaces between a sill plate and a foundation wall.

BACKGROUND OF THE INVENTION

Many structures are constructed having a concrete foundation on which the bottom plate or 'sill plate' of a framed floor or wall rests. A substantial amount of energy loss, heat in the winter and air conditioning in the summer, occurs at the interface between the top of the foundation and the sill plate. Building codes generally require some sort of sill sealer be placed between the top of the foundation wall and the sill plate to reduce these energy losses. Often, the sill sealer is a thin layer of polyethylene foam that lays on top of the foundation wall prior to placement of the sill plate on top of the sill sealer. This thin layer of foam creates a gasket-type seal between the foundation wall and sill plate once the structure is completed.

Existing gasket-type sill sealers do not have the ability to conform to the irregularities present on the top of typical foundation walls, especially if the foundation wall is rough, uneven, or has one or more low spots. Gasket-type sill sealers do not generally conform to these irregularities; accordingly, these spots tend to be 'bridged over,' leaving a void between the sealer and the foundation wall. Additionally, if the foundation wall shrinks and/or expands after the structure is completed, additional voids between the sealer and the foundation wall may be created. Voids between the sealer and the foundation allow a considerable amount of energy to be lost from the structure, water to infiltrate to the interior surface of the structure, and provide a passageway for insects and rodents to enter the structure.

SUMMARY OF THE INVENTION

In view of the foregoing, it is the principal objective of the present invention to provide an improved air and moisture barrier for use between a foundation wall and a sill plate.

It is a further objective of the present invention to provide an air and moisture barrier that conforms to irregularities of a foundation wall.

It is a further objective of the present invention to provide an additional barrier outside of a structure to help further seal the interface between a foundation wall and sill plate.

In accordance with the above objectives, the inventor of the present invention has recognized that existing sill sealers often lay on top of the foundation wall prior to assembly and are prone to shift during construction such that in some places there may be no sealer between the foundation wall and sill plate. In turn, the inventor has recognized the desirability of providing a sill sealer which adheres to rough/uneven surfaces of a foundation wall allowing it to better conform to the foundation wall. Finally, the inventor recognized that, by providing an additional barrier on the outside of a structure, any voids left by a gasket-type sealer between a foundation wall and sill plate may be effectively sealed.

The above objectives are achieved by the present invention which provides for an air and moisture barrier laminate for sealing the interface between a sill plate and a foundation wall. The moisture barrier assembly comprises a compressible spacer layer for compression between a foundation wall and a sill plate, and an adhesive layer interconnected to a face of the compressible spacer layer, which is selectably adherable to the foundation wall. As will be appreciated, the laminate will generally be adhered to the foundation wall such that a surface of the spacer layer is exposed to receive the sill plate upon assembly. In one preferred embodiment, the laminate's adhesive layer may be covered with a release sheet layer that may be peeled away from the adhesive layer to expose an adhesive surface prior to application of the laminate to the foundation wall. In a further preferred embodiment, the adhesive layer will comprise a membrane which may have adhesive and/or waterproof characteristics as will be more fully described below.

In one embodiment, the adhesive layer comprises a membrane having a top surface interconnected with the spacer layer and a bottom adhesive surface for selective attachment to the foundation wall. In this regard, the membrane's bottom adhesive surface may be disposed in a face to face relationship with the top of the foundation wall. In a further embodiment, this membrane may also contain a second portion not interconnected to the spacer layer. Upon application, this second portion may extend beyond the outside edge of the foundation wall such that it may be folded over and attached to a side surface of the foundation wall. In this embodiment, the laminate may further comprise a second waterproof membrane attached to the second portion. This second membrane may further comprise an adhesive surface for selective connection to a side surface of the sill plate. Preferably, both membranes' adhesive surfaces are covered with a release sheet prior to attachment. As will be appreciated, upon application, the laminate of this embodiment generally comprises a cross-sectional shape of a "T" wherein the spacer layer forms the T's leg between the sill plate and foundation wall and the first membrane's second portion and second membrane form the top of the T on the side surfaces of the sill plate and foundation wall. As will be appreciated, upon erection of a structure, this moisture barrier laminate provides a gasket-type seal compressed between the top of the foundation wall and the sill plate and a continuous membrane extending between the sill plate side surface to the foundation wall side surface, thus providing a second layer of protection at the structure's interface.

The laminate's spacer layer comprises a compressible material that preferably has a generally uniform thickness and material characteristics which allow the spacer layer to be both securely adhered to a surface of an adhesive layer and conform to uneven surfaces. As will be appreciated, the assembly may utilize spacer materials having different thicknesses for different applications. For example, in instances where very rough or uneven surfaces need to be sealed, a relatively thick spacer material (e.g., 1 inch) may be used as larger irregularities may be expected. In contrast, where relatively smooth surfaces need to be sealed, a thinner spacer material (e.g., ⅜ inch) may be used. The spacer material will generally be elastically deformable when compressed between the sill plate and foundation wall such that the spacer material conforms to and fills the spaces or 'voids' therebetween. In this regard, the spacer material acts as a gasket between the top of the foundation wall and the generally smooth bottom surface of the sill plate. By way of example, the spacer material may be comprised of a commercially available fiberglass, cellulose or polymer foam insulation, although other material and/or combinations of materials, are also acceptable. Suitable polymer foams include polyethylene, polystyrene, and polyurethane. Closed cell polyethylene foams are particularly well suited for the present invention.

By having the spacer material layer interconnected directly to an adhesive layer, the spacer material may be adhered to a desired surface, such as the top of a foundation wall. This arrangement may allow for the spacer material to expand and contract with the desired surface and thus, prevent voids from forming between the spacer material and the surface. Additionally, in the case where the spacer material attached to an adhesive layer is adhered to an uneven surface of a foundation wall, the spacer may be adhered to low spots and adhesively seal around irregularities on the foundation wall surface, thus preventing voids between the foundation wall and the spacer material.

In the embodiments where the membrane(s) is/are utilized, each membrane will generally comprise a plurality of layers. These layers may include, inter alia, a base layer of sheet-like material such as, paper, fabric, synthetic foam, film, or a strong inert reinforcement layer able to withstand puncture and severe stress such as a polyester mesh, and one or more adhesive layers that may be covered by some sort of release sheet. Preferably, the membrane(s) will contain an adhesive bitumen layer on one or both faces of the base sheet/reinforcement layer which may impart both waterproof and self-adhesive properties to the membranes. These adhesive bitumen layers are preferably protected by a release sheet which may be made of waxed paper, plastic or any other suitable covering which may be peeled from the adhesive bitumen layer at the time of application.

The first membrane will generally comprise top surface and a bottom adhesive surface for interconnection with the foundation wall. As noted, the adhesive surface may be formed using a separate bitumen containing layer which may be laminated on some sort of base/reinforcement layer. The compressible spacer material may be interconnected to the top surface such that the lateral edges of the spacer and membrane are aligned. In the embodiment where a second membrane is utilized, the spacer material will be of a width less than that of the first membrane such that a portion across the width of the first membrane is covered with the spacer material and a second portion across the width of the first membrane contains no spacer material. This second portion of the membrane's top surface may be interconnected with the second membrane. The first membrane may be oriented on a foundation wall such that a portion of the bottom adhesive side, which is covered on the top surface by the spacer material, sets on the top surface of the foundation wall and a second portion of the first membrane extends over the outside edge of the foundation wall. When so positioned, the second portion may be folded over such that it may be adhered to a side surface of the foundation wall.

The second membrane, which contains at least a first adhesive surface, is typically interconnected to the second portion of the first membrane and is therefore oriented such that it is not compressed between the sill plate and foundation wall upon assembly. In one embodiment, a first section of the second membrane may be interconnected to the second portion of the first membrane's top surface (i.e., on the same side as the spacer material). The spacer material and second membrane may be disposed such that they cover the entire width of the first membrane's top surface or such that a space exists between where the spacer material attaches and where the second membrane attaches. When the second portion of the first membrane is attached to the side surface of the foundation wall a section of the second membrane is attachable to the side of the sill plate upon erection of the structure. In one embodiment, the second membrane's second portion comprises a self-adhesive material (e.g., bituminous layer) covered by a peel-away release sheet. In this embodiment, the other side of the second membrane will generally be exposed to the elements, accordingly, this exposed side may comprise a plastic base sheet or some sort of resilient and/or decorative coating.

In accordance with the above objectives, a method is provided for installing an air and moisture barrier laminate for sealing the interface between a sill plate and a foundation wall. The method comprises the steps of providing an air and moisture barrier laminate that comprises a compressible spacer layer for compression between the top of a foundation and the bottom of a sill plate and an adhesive layer interconnected to the spacer layer for selectively interconnecting the laminate to the foundation wall. The laminate may be located such that the adhesive layer and the spacer layer are located on the top surface of the foundation Wall. More particularly, the laminate may be oriented such that the adhesive layer is disposed in a face to face relationship with the top surface of the foundation wall. The step of locating the laminate on to the foundation wall may further include the step of removing a release sheet from the adhesive layer such that an adhesive surface is exposed. This release sheet may be removed before or after the air and moisture barrier laminate is positioned on the top surface of the foundation wall. Once the laminate is located with the adhesive surface exposed, the laminate is pressed onto the foundation wall top surface to securely adhere the spacer layer thereto. Next, the sill plate of a framed floor/wall is placed on top of the spacer layer, such that the spacer layer is disposed between the sill plate and foundation wall. As will be appreciated, since the air and moisture barrier laminate is adhered to the top of the foundation wall, the laminate is resistant to movement during erection of the sill plate on top of the laminate; therefore, the gasket-type seal between the sill plate and the foundation wall will stay positioned during construction.

An apparatus for producing the above noted embodiments of the air and moisture barrier laminate is also provided. That is, a machine for laminating at least one membrane adapted for attachment to a foundation wall to a spacer material of a predetermined thickness for compression between the foundation wall and a sill plate erected thereon. Further, this machine may be used laminate a second membrane onto a portion of the first membrane, wherein this second membrane is adapted for attachment to a sill plate. As will be appreciated, this two membrane laminate forms the generally T-shaped air and moisture barrier laminate described above.

The apparatus comprises first and second cylindrical rollers mounted along their longitudinal axes in a parallel opposed relationship. These rollers are operative to rotate in a cooperative manner such that when one roller turns the other roller may turn in the opposite direction to compress materials therebetween. In this regard, one side of the rollers will form a pinch or inlet "nip" into which materials are drawn for compression. Accordingly, the apparatus contains means, such as a variable speed electrical motor, to turn at least one of these rollers. The apparatus further comprises a first holder for holding a length of a first membrane having a surface adapted for securement to the foundation wall. A second holder is utilized to hold a length of spacer material having a predetermined thickness for compression between a foundation wall and sill plate when the air and moisture barrier laminate is in use. Finally, the apparatus contains a third holder for use, when desired, to hold a length of a second membrane having a portion adapted for securement to the sill plate when the laminate assembly is utilized. As will be appreciated, the first second and third holders are in a spaced relationship with one other as well as the first and second rollers to allow materials contained thereon to be received at the inlet nip defined by the rollers. That is, the first membrane, spacer material, and if utilized, the second membrane are oriented so they may be drawn into the inlet between the rollers in a desired orientation relative to one another. The compressive force applied by the rollers laminates the various materials together to produce the air and moisture barrier laminate.

Generally, each the first and second membrane will comprise at least one surface coated by a bitumen containing material that will provide adhesive and waterproofing qualities to that surface. Prior to being received at the inlet nip for compression into the laminate structure, these adhesive bitumen containing surfaces may be covered with peel-away release sheets. In order to laminate the membranes and spacer together, at least a portion of these release sheets is generally removed from one adhesive surface of each membrane. For example, the first membrane will generally comprise a double sided adhesive membrane that may initially be covered on both surfaces with a release sheet. In order to laminate the spacer material and the second membrane onto first and second portions across the width of this first membrane, the entire release sheet covering one adhesive surface may require removal. In this regard, a means for removing the release sheet, such as take-up roll, may be utilized to separate the release sheet from the first membrane's surface prior to that membrane entering the inlet nip. Alternatively, it may be desirable to remove only a portion of a release sheet from its adhesive surface. In this regard, the apparatus may further comprise a cutter for selectively cutting the release sheet a predetermined distance from the longitudinal edge of the membrane on which it is adhered. The cutter, such as a blade or sharp point, may be disposed such that it scores or cuts through the release sheet but does not structurally damage the membrane underneath. Accordingly, the cutter may also contain an adjuster for adjusting the depth of the cut. Again a take-up roll for removing the desired section of the release paper may be utilized that is operable to 'wind-up' the removed section of paper at a rate that is equal to the rate the membranes move in the lamination process. Regardless of whether a portion or all the release sheet is removed, the removal means will be disposed between the holders and the inlet nip of the rollers.

Preferably, the holders are sized to receive and hold their respective materials in the roll form that may be axially mounted. Still more preferably, these holders are operative to hold materials of varying widths allowing laminate structures having differently sized components to be produced. For example, the first membrane may have a width of, for example, four to twelve inches depending on its desired use. That is, in cases where the first membrane is only utilized to attach a compressive spacer material to the top surface of a foundation wall, a narrower membrane, e.g., four inches to accommodate a standard 2x4 sill plate, may be utilized. Alternatively, where the first membrane attaches to the top and side surfaces of the foundation wall, a wider membrane may be utilized allowing for this membrane to extend entirely across the top surface of the foundation wall (e.g., eight inches) and fold a predetermined distance over the side surface of the foundation wall (e.g., 4 inches). Likewise, the width of the spacer material may vary upon application but will generally have a width between 2 and 8 inches and more preferably between 3.5 to 5.5 inches to accommodate standard lumber widths utilized in frame construction. The second membrane may also be chosen to satisfy a particular end use, generally, this membrane will be between about 3 and 8 inches in width.

As noted above, the first and second rollers apply a predetermined compressive force to the materials as they pass between these rollers. To adjust this predetermined force, one of the rollers may be mounted to allow selective movement relative to the other roller. This movement adjusts the distance between and, therefore, the compressive force applied by the rollers to a laminate of predetermined thickness passing therethrough. For example, the first roller may be mounted a predetermined distance from the second roller and held in that position with a predetermined force. If the laminate passing through the rollers applies a force greater than this predetermined holding force to the adjustable roller, this roller may "give" (i.e., move slightly away) until the desired compressive force between the rollers is restored. Generally, the rollers are mounted a predetermined distance from one another less than the thickness of the laminate so a compressive force may be applied across the surface of the laminate as it passes through the rollers. Additionally, one of the rollers may have a varying diameter along its length such that a different compressive force may be applied along the width of a laminate passing through the rollers. For example, a roller with a first diameter on a first section and a second, larger diameter on a second section may be operable to provide a greater compressive force to a portion of a laminate passing through the second section and a lesser compressive force on the portion passing through the first section. Alternatively, the, the "two-diameter" roller may apply a nearly uniform compressive force across a laminate having two thicknesses across its width.

In another aspect of the present invention, a process is provided for producing air and moisture barrier laminate for sealing the interface between a sill plate and a foundation wall. The process comprises the steps of providing a first membrane having a first adhesive surface sized for interconnection to a foundation wall; providing a spacer material for compression between a foundation wall and a sill plate; and providing a second membrane with a first adhesive surface sized for interconnection to a portion of the first membrane and a sill plate. The spacer material and a portion of the second membrane are contacted to first and second portions across the width of the first membrane's second surface, which is also, preferably, an adhesive surface. Finally, a compressive force is applied to the materials to continuously laminate a length of the materials together in the desired orientation. Preferably, this process is performed using an apparatus that utilizes compressive rollers to apply the compressive force to the materials.

The first and second membranes may have one or two release sheets covering their adhesive surface(s). In this regard, the step of providing may further comprise removing part or all of these release sheets to expose the adhesive surfaces for contacting and lamination purposes. For example, the entire release sheet may be removed from the first membrane's second surface to provide an adhesive surface for contacting the spacer material and second membrane. In addition, to increase bonding, the portion of the second membrane contacting the first membrane may also be an exposed adhesive surface from which a portion of a release sheet was removed.

DETAILED DESCRIPTION

Figure 1:
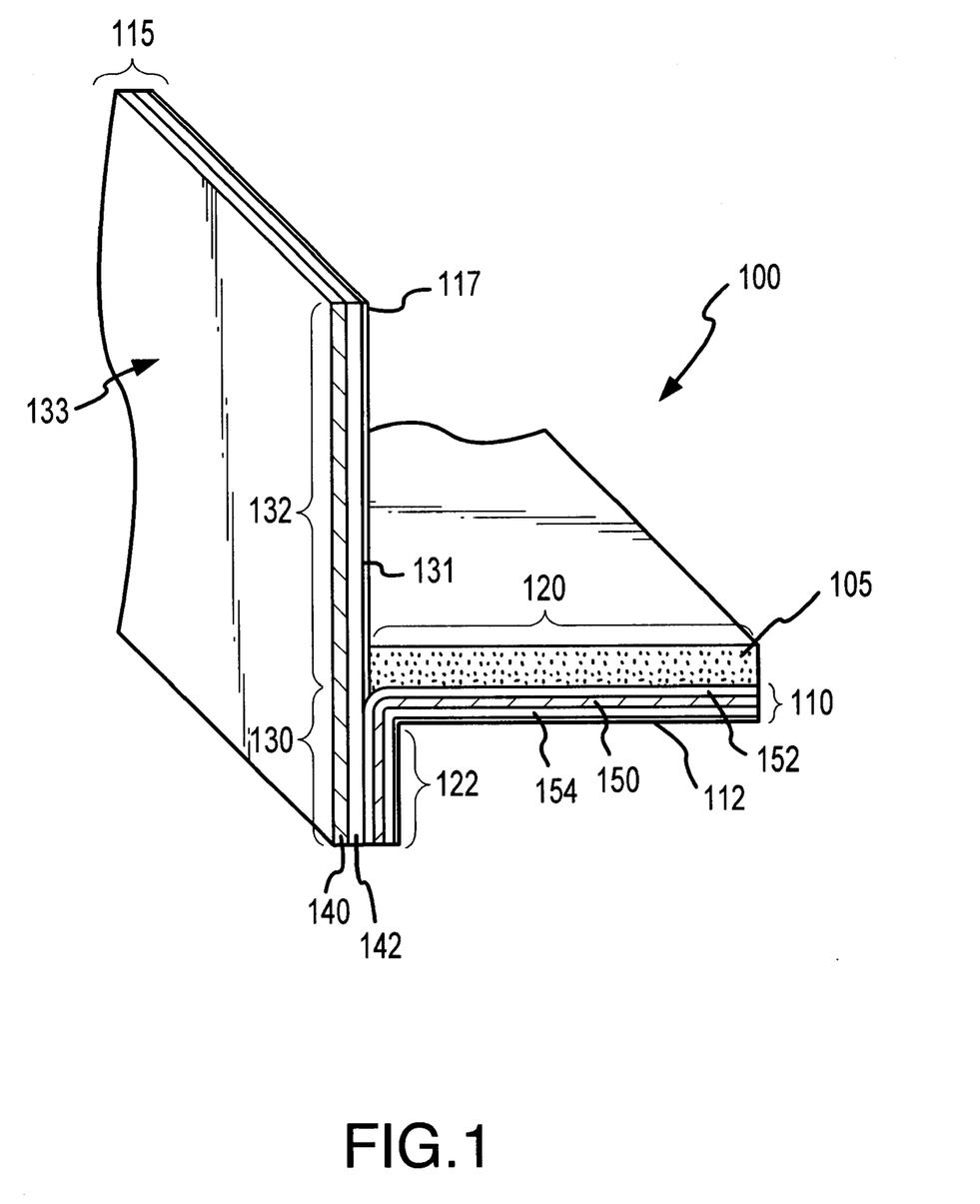
FIG. 1 shows a perspective view of the air and moisture barrier of the present invention.

FIG. 1 shows one embodiment of an air and moisture barrier assembly 100 produced in accordance with the present invention. FIG. 1 shows a perspective cross sectional view of the assembly 100 (not to scale), which comprises a spacer material 105, a first adhesive waterproof membrane 110 (hereinafter "first membrane"), a first peel-away release sheet 112 releasably interconnected to the first membrane's adhesive bottom surface, a second adhesive waterproof membrane 115 (hereinafter "second membrane"), and a second peel-away release sheet 117 releasably interconnected to a portion 132 of the second membrane's adhesive inside surface 131. As shown in FIG. 1, a spacer material 105 is laminated onto a first portion 120 of the first membrane's top surface.

The first and second membranes 110, 115 are constructed having a reinforcing layer 150 and base sheet layer 140, respectively, and various bitumen-containing layers 152, 154 and 142. These bitumen-containing layers are both adhesive and waterproof allowing a single bitumen layer to adhesively attach the assembly 100 to a surface and provide waterproofing for that surface. Examples of suitable materials for use in constructing the bitumen layers 152, 154 and 142 include bitumen-containing materials such as various tar adhesives and rubberized asphalts, as well as certain butyl-rubber compounds. In the illustrated embodiment, the adhesive layers 152, 154 and 142 are constructed from a modified, rubberized asphalt material. The rubberized asphalt material comprises a combination of petroleum, asphalt/road flux components (i.e., bituminous components), carbonate components such as calcium carbonate, styrene-isoprene-styrene block G co-polymer components, and miscellaneous stabilizing additives. Such a composition has been found to provide excellent dimensional stability, pliability and adhesion under actual use conditions, particularly when used in combination with a reinforcing layer.

The membranes 110, 115, as shown, include a reinforcing layer 150 and base sheet 140, respectively, to improve their strength and dimensional stability. However, it will be appreciated that the membranes may simply comprise bitumen-containing layers that do not utilize a reinforcing layer/base sheet to provide a membrane with increased flexibility. Preferably, the base sheet layer 140 and reinforcing layer 150 are constructed from a material that is elastically deformable to allow the assembly 100 to be easily rolled for transportation or storage, unrolled for application, and to conform to a surface without undesired creases or bends. In one embodiment, the first membrane 110, comprises a polyester mesh reinforcing layer 150 sandwiched between two adhesive bitumen layers 152, 154 and the second membrane 115 comprises a plastic base sheet layer 140, which makes up the membrane's outside surface 133, and an adhesive bitumen layer 152 making up the membrane's inside surface 131.

The assembly 100, as noted, has two peel-away release sheets 112, 117 to prevent undesired sticking of the assembly's adhesive surfaces during transport and storage or while the assembly is being positioned/shaped. Many different foils, films, papers or other sheet materials are suitable for use in constructing the release sheets 112, 117. For example, the release sheets may comprise a metal, plastic, or paper sheet treated with silicon or other substances to provide a low level of adhesion to the bitumen layers 154, 142 on the first and second membranes 110, 115 while maintaining their peel-away qualities.

Figure 2:
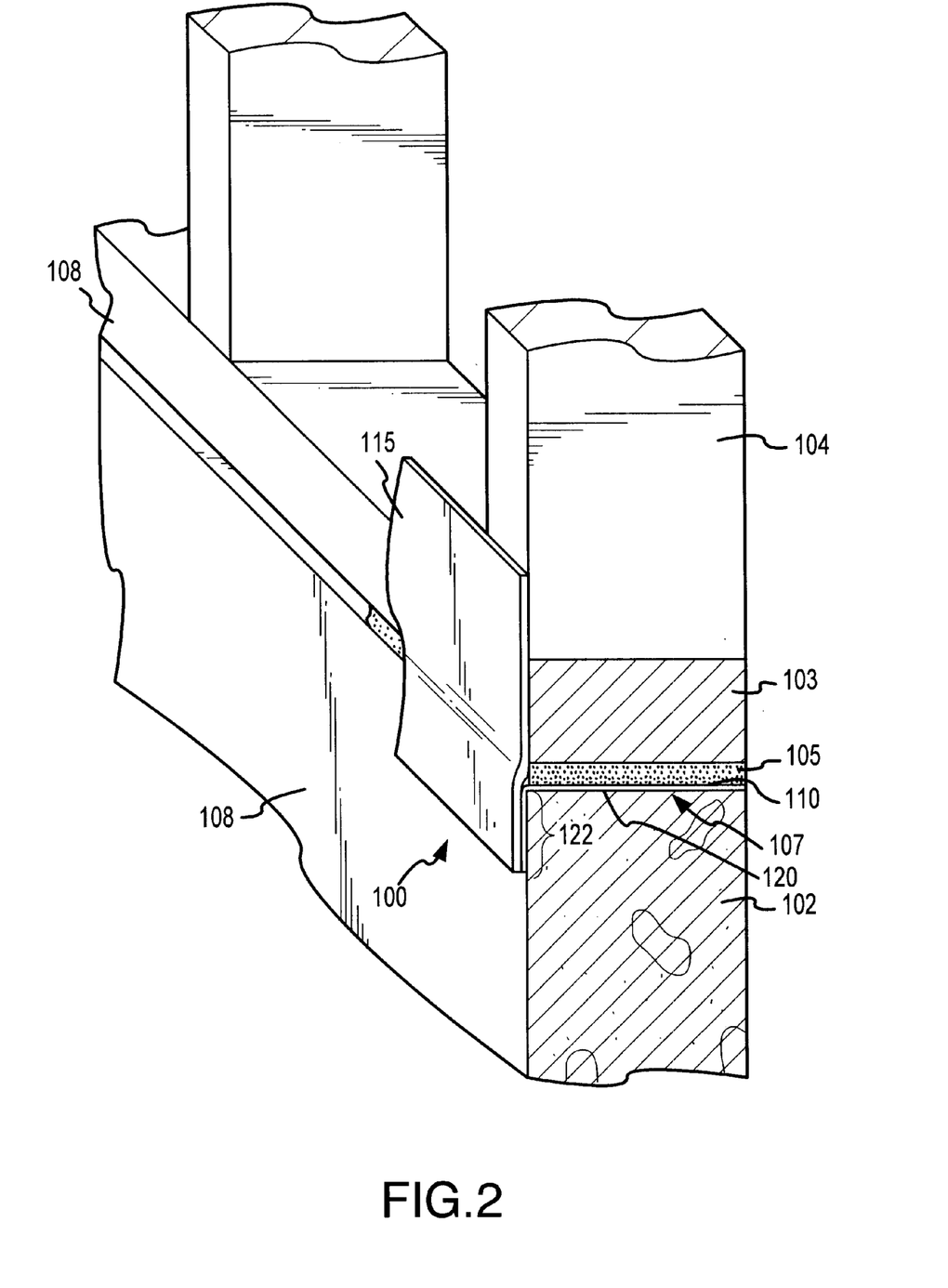
FIG. 2 shows a perspective view of the air and moisture barrier of the present invention applied between a foundation wall and a sill plate.

The spacer material 105 is made of a closed cell polyethylene foam that is compressibly deformable when placed between two surfaces. The width of the spacer is dependent on the structure to which it will be applied, as will be described herein. It has been discovered that a spacer thickness between ¼ inch and 1.5 inches will effectively seal most interfacing surfaces. As shown, the spacer material 105 is oriented on the top side of the first membrane 110 such that the spacer material's interior lateral edge is even with the first membrane's interior lateral edge. During formation of the assembly 100, as will be more fully discussed, the spacer material 105 is pressed into contact with a first portion 120 of the adhesive bitumen layer 152 on the top side of the first membrane 110 which effectively connects the spacer material 105 to the first membrane 110 without the use of a separate adhesive. Additionally, a first portion 130 of the second membrane 115 is adhered to a second portion 122 of the first membrane's top surface. As shown in FIG. 2, once formed, the assembly's the first and second membranes 110, 115 form a body which generally comprises a cross-sectional shape of a "T" when positioned between a foundation wall 102 and sill plate 103.

Referring to FIGS. 1 and 2, the air and moisture barrier assembly 100 is showed disposed between a foundation wall 102 and the sill plate 103 on the bottom of a stud wall 104. As shown, the assembly 100 is positioned such that the first portion 120 of the first membrane 110 and the interconnected spacer material 105 is disposed between the sill plate 103 and the foundation wall 102 creating a gasket-type seal between the surfaces. Additionally, the second section 122 of the first membrane 110 and the entire second membrane 115, are positioned on the outside surfaces 108 of both the foundation wall 102 and the sill plate 103.

The dimensions of the air and moisture barrier assembly 100 are typically determined by the specifications of the structure to which the assembly 100 is applied. For example, in frame construction it is known that most structures are constructed from either 2×4 or 2×6 lumber. In the case of 2×6 construction, it is desirable for the spacer to be at least 5.5 inches wide (the actual width of a 2×6 board) to provide a spacer 105 for compression along the entire width of the 2×6 sill plate 103. Accordingly, the first membrane's first portion 102 will be at least 5.5 inches wide to accommodate the spacer 105 and the membrane's second portion 122 will be an additional 2–3 inches wide to extend over the edge of the foundation wall 102 for attachment thereto. In this regard, for frame construction, the first membrane 110 will have a width between 4 and 12 inches, the spacer 105 will have a width between about 3 and 8 inches and the second membrane 115 will have a width between about 3 and 8 inches.

In applying the air and moisture barrier, the assembly 100 can be positioned on the top surface 107 of the foundation wall 102 and cut to shape if necessary with the peel-away release sheets 112, 117 in place to avoid undesired adhesion. Additionally, the top surface 107 of the foundation wall 102 should be cleaned of any debris to increase the bonding qualities with the adhesive bitumen layer 154 on the bottom surface of the first membrane 110. Once the assembly 100 has been cut to the appropriate size and positioned on the foundation wall top surface 107, a portion of the release sheet 112 can be peeled away to expose a portion of the adhesive bitumen layer 154 on the bottom side 123 of the first membrane 110 (See FIG. 1). The exposed portion can then be pressed against the foundation wall's top surface 107, thereby securing the position of the assembly 100. Thereafter, the remainder of the assembly 100 can be progressively applied to the top surface 107 by peeling the remainder of the release sheet 112 from the first membrane 110 and pressing the first membrane 110 against the top surface 107. Once the first portion 120 of the first membrane 110 is securely attached to the foundation wall's top surface 107, the second portion 122 of the first membrane 110 may be adhered to the foundation wall's outside surface 108 by pressing it into contact with this outside surface 108. At this point, the air and moisture barrier assembly 100 is securely attached to the foundation wall 102 and ready for the sill plate 103 to be constructed/erected thereon. As will be appreciated, since the air and moisture barrier assembly 100 is adhered to the top surface 107 of the foundation wall 102, the assembly 100 will not move during assembly of the stud wall 104 and sill plate 103 thereupon. Once the stud wall 104 and along with its sill plate 103 have been placed upon spacer material 105, the second release sheet 117 is removed from the second membrane's second inside surface 131 to expose the adhesive bitumen layer 142, which is then pressed against the outside surface 108 of the sill plate/stud wall 103/104.

The above described air and moisture barrier assembly 100 has a number of advantages over prior sill sealing products. First, the assembly 100 eliminates the need for a separate means to hold a gasket-type seal in place while a structure is being built on top of a foundation wall 102, as the assembly 100 is securely adhered to the foundation wall 102 by the adhesive membrane 110. In addition, due to the elastic nature of the membrane 110, which is adhered to the top surface 107 of the foundation wall 102, expansion and contraction of the foundation wall 102 can be accommodated without voids being created between the foundation wall 102 and the gasket seal through which air and/or water and/or insects may penetrate the structure. Moreover, the air and moisture barrier assembly 100 provides a continuous seal on the outside surface 108 of the structure between the foundation wall and the sill plate, thus, providing yet an additional barrier between the inside and outside of a structure at the sill plate/foundation interface.

Figure 3:
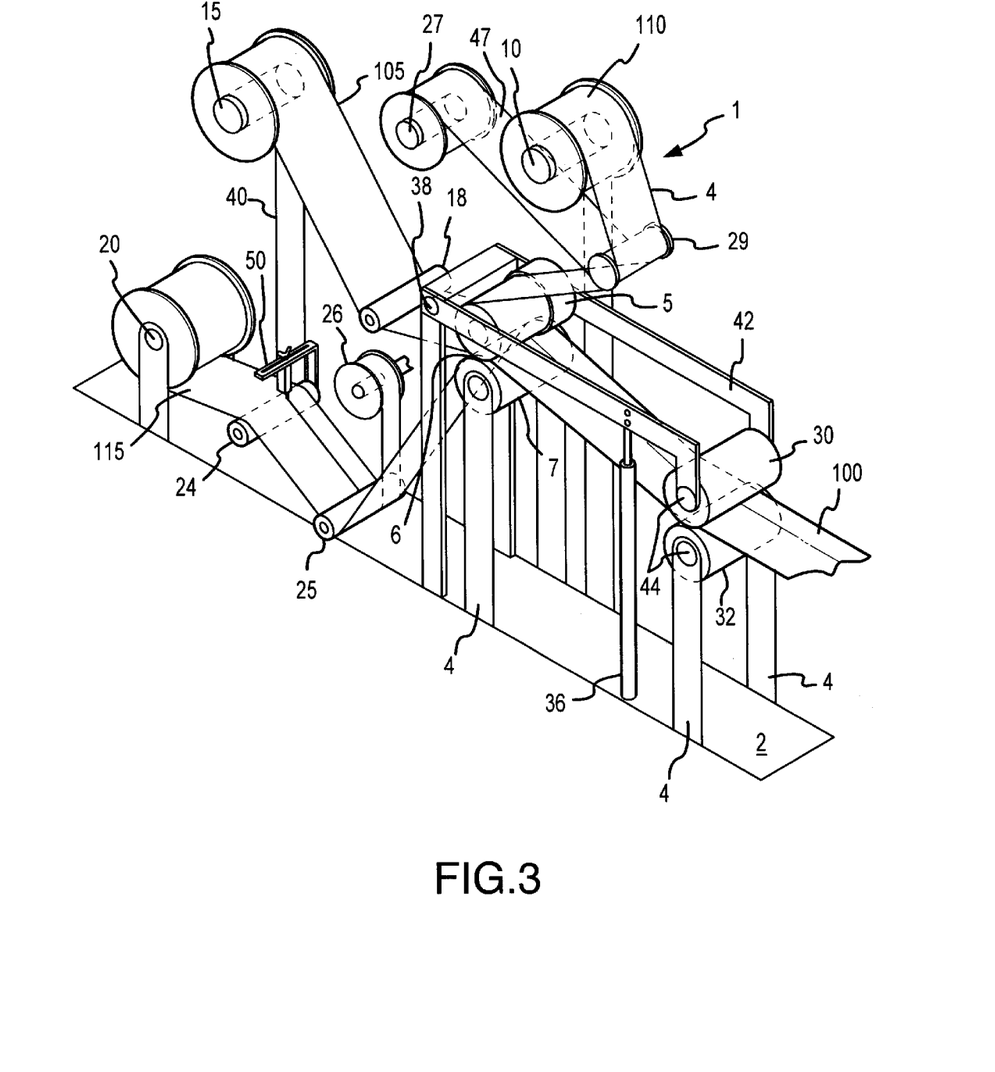
FIG. 3 shows a perspective front view of the apparatus used to produce the air and moisture barrier assembly.
Figure 4:
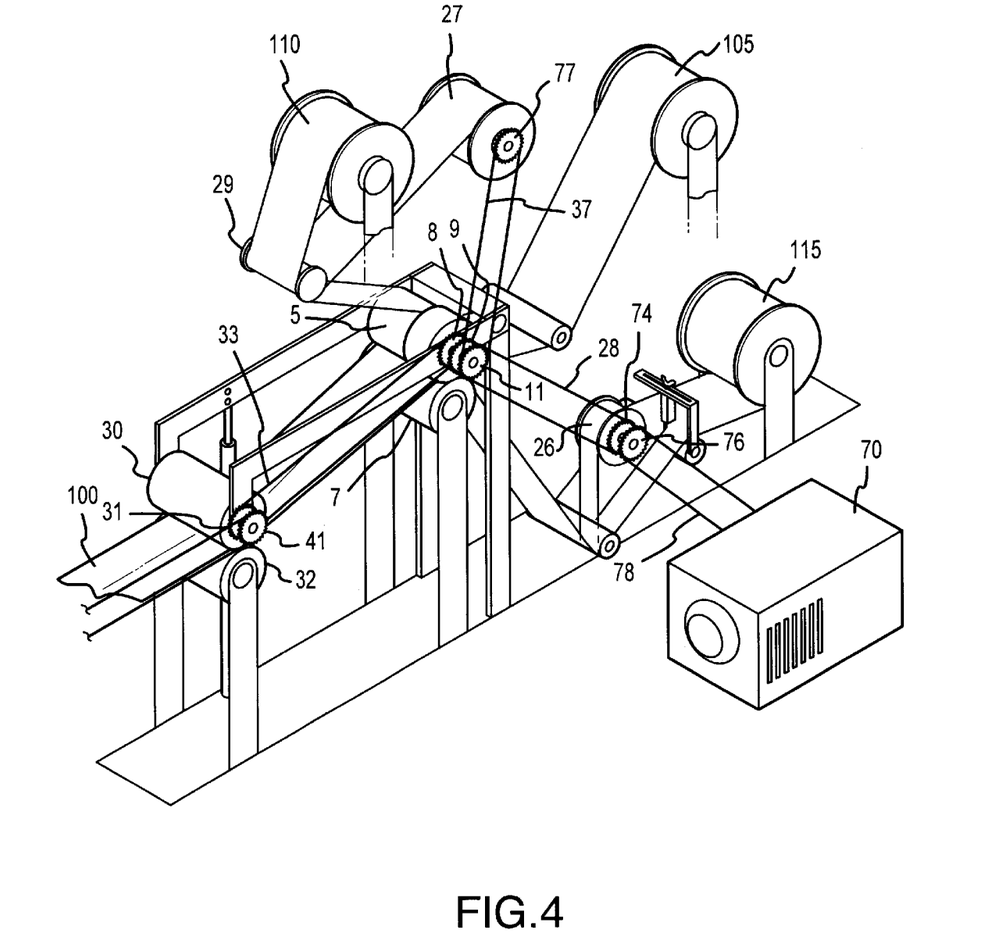
FIG. 4 shows a rear perspective view of apparatus of FIG. 3.
Figure 5:
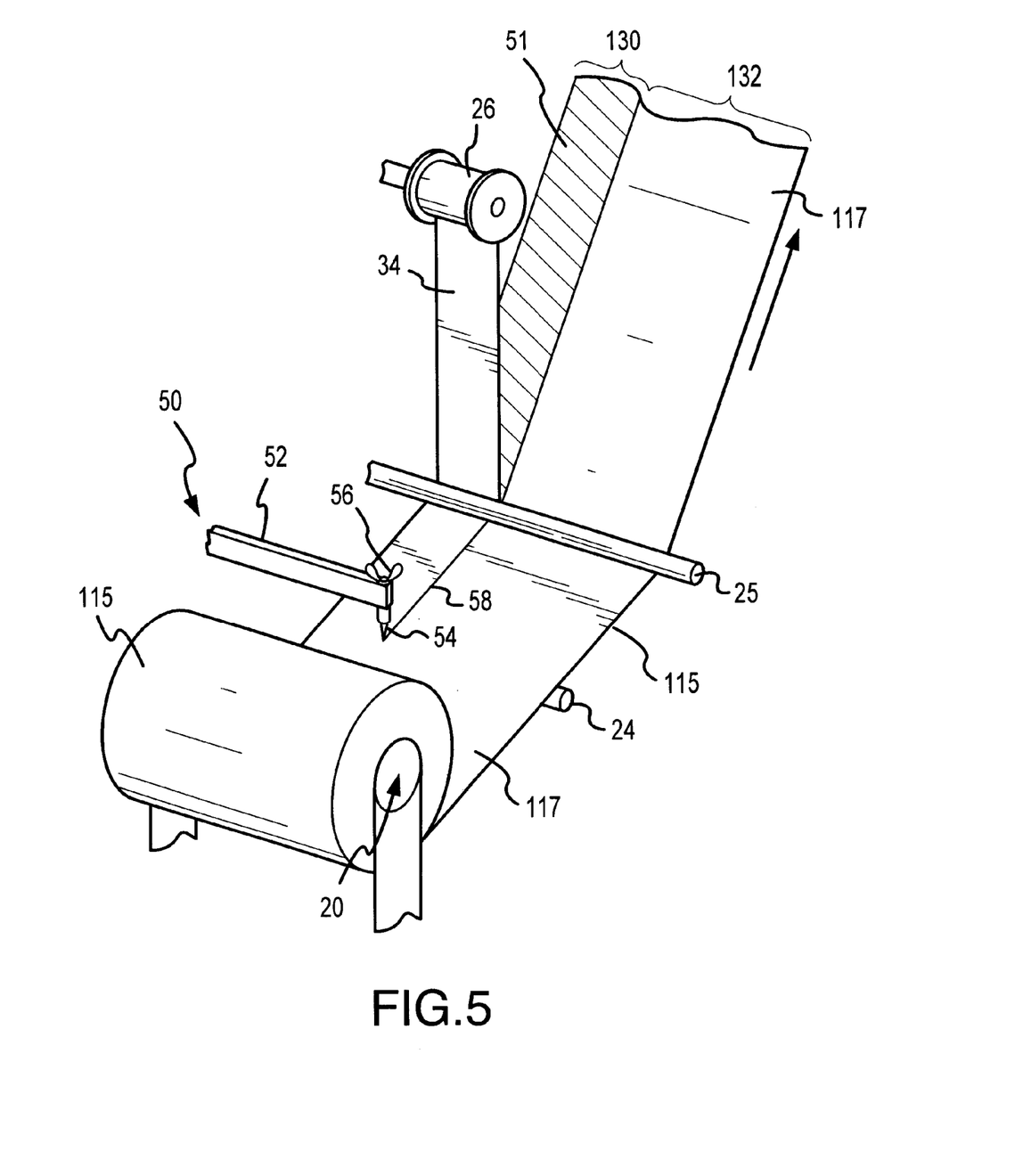
FIG. 5 shows a perspective view of a release sheet cutter and removal means of the apparatus of FIG. 3.

Referring to FIGS. 3, 4 and 5, an apparatus 1 is shown for producing the air and moisture barrier assembly 100 described above. The apparatus is operative to remove all or a portion of a release sheet attached to the adhesive surfaces first and second membranes and laminate these membranes together along with a spacer material in a known relationship to produce the air and moisture barrier assembly 100. As shown in FIG. 3, the apparatus 1 comprises first, second and third spindles 10, 15, and 20 for rotably mounting first, second and third supply rolls of a double-sided adhesive membrane 110, a spacer material 105 and a single-sided adhesive membrane 115, respectively. During operation, these materials are supplied to a first pair of rollers comprising a drive roller 5 and a compression roller 7 for lamination together. The materials are oriented at the inlet nip 6 defined by the rollers 5, 7 using various tensioning rollers 18, 24, 25 and 29. In addition, the apparatus 1 contains a release sheet cutting means 50, a first take-up roll 26, a second take up roll 27, and a second set of rollers having a second drive roller 30 and a second compression roller 32. The compression rollers 7, 32, take-up rolls 26, 27 as well as the supply spindles 10, 15, 20, are mounted to the apparatus' base 2 utilizing various support structures 4 some of which are not shown for illustrative purposes, additionally, the support structures for all the tensioning rollers 18, 24, 25 and 29 are not shown for purposes of clarity. These tensioning rollers 18, 24, 25, and 29 are metal cylinders mounted about their central axes operable to rotate as their respective membrane/spacer materials are drawn over them. Each of these tensioning rollers may further comprise a clutch mechanism (not shown) to provide a desired turning resistance to keep their materials taut between the "tensioned" roller and the inlet nip 6 of rollers 5 and 7.

The drive rollers 5, 30 are attached to a top carrier assembly 42 so that each drive roller 5, 30 is in a parallel opposing relationship a predetermined distance away from its mating compression roller 7, 32. All of the rollers are mounted to their respective structures using a bearing assembly 44 that allows the rollers to freely rotate about their central axes. Additionally, rollers 5, 7, 30, and 32 may contain any suitable non-stick coating such as Teflon or spray-on release agents to prevent the adhesive membranes from sticking to their surfaces during the operation of the apparatus 1. Drive roller 5 is a stepped roller having a first diameter along a first axial section and a second diameter along a second axial section. This 'step' allows for two separate compressive forces to be applied across the width of a laminate passing between the rollers 5, 7. As will be further discussed herein, a first section of the air and moisture barrier assembly 100 passing between the rollers 5, 7 will contain the spacer material 105, the first membrane 110 and the second membrane 115, while a second section of the laminate assembly 100 will contain only the first and second membranes 110, 115. The increased diameter section of the stepped roller 5 provides a thinner path between the rollers 5 and 7, allowing for the section of the laminate assembly 100 containing only the two membranes 110, 115 to receive sufficient compressive force between the rollers 5, 7 to effectively laminate these two membranes 110, 115 together while the thicker section of the laminate 100 is also compressed to predetermined amount. Preferably, the compressive force will be substantially uniform across the width of the laminate assembly 100 notwithstanding the variations in laminate thickness.

The apparatus 100 also contains a two-way pneumatic cylinder 36 that is operable to selectively apply variable upward and downward forces to the top carrier assembly 42. In this regard, the two-way pneumatic cylinder 36 is fluidly connected to an air source, a regulating means, and some sort of actuation valve for switching between upward and downward operation. The specific type and configuration of these components is incidental to the operation of the apparatus 100 and, therefore, not shown. During operation of the apparatus 100, the pneumatic cylinder 36 applies a predetermined downward force to the carrier assembly 36 that holds the rollers 5, 7 together with a predetermined force and resists "spreading" of the rollers by materials passing therebetween. If the materials passing through the rollers 5 and 7 are of a thickness, that the compressive force applied to these materials exceeds this holding force, the carrier assembly 36 is forced upwards allowing the rollers to spread apart slightly to restore the desired compressive force between the rollers 5 and 7. As will be appreciated, depending on the distances between the top carrier assembly's hinge 38, the compression rollers 5, 7 and the point of application of the holding force by the pneumatic cylinder 36, the compressive force between the rollers 5, 7 may vary for a given pressure of the pneumatic cylinder 36. However, it has been found than any orientation of the hinge 38, rollers 5, 7 and pneumatic cylinder 36 that provides a compressive force between 150–250 lbs. across the width of the rollers 5, 7 provides a sufficient compressive force to produce a well laminated assembly 100. More particularly, it has been found that between 20–40 lbs. of compressive force per inch width of the laminate assembly 100 provides the best laminating results. The pneumatic cylinder 36 may also apply an upward force to the top carrier assembly 42 to produce an angular displacement around hinge 38 and thus separate both sets of rollers 5, 7 and 30, 32. This separation allows the membranes 110, 115 and spacer material 105 that make up the air and moisture barrier assembly 100 to be "threaded" into the apparatus 1 prior to operation.

FIG. 4 shows a rear perspective view that shows the various drive components of the apparatus 1. Again, for clarity, a number of the support sprocket 8, 31 interconnected by a chain 33. These sprockets 8, 31 are affixed to the drive rollers 5, 30 such that when the sprockets 8, 31 turn, the drive rollers 5, 30 turn. Drive roller 30 contains a second sprocket 41 interconnected by a chain to a laminate take-up roll (not shown). The laminate take up roll is used to wind the laminated assembly 100 exiting the second set of rollers during production. Drive roller 5 contains second and third sprockets 9, 11 axially aligned with the first sprocket 8. The second sprocket 9 is interconnected to the second take-up roll 27 by a chain 37. The third sprocket 11 is connected by another chain 28 to a sprocket 74 interconnected to the first take-up roll 26. The first take-up roll 26 also contains a second sprocket 76 connected via a chain 78 to a sprocket (not shown) attached to a variable speed drive motor 70. Accordingly, when the drive motor 70 is operated the various chains and sprockets turn. As will be appreciated, since the drive roller sprockets 8, 31 are equal size, drive rollers 5, 30 will rotate at the same speed. However, due to varying sizes of, for example, the various take-up rolls 26, 27 the "gear" ratios of the various sprockets interconnected thereto may vary to allow these components to turn in a cooperative manner with the drive rollers 5, 30 at predetermined speeds.

Referring again to FIG. 3, the first, second, and third spindles 10, 15, and 20 receive supply rolls of their respective materials in a manner that allows these supply rolls to turn. In this regard, when the apparatus 1 operates, the membranes/spacer materials contained on the supply rolls are drawn into the inlet nip 6 between the first set of rollers 5, 7. The first spindle 10, holds a supply of a membrane 110 having two adhesive surfaces, which prior to lamination, are each covered by a release sheet. For the lamination process one of these release sheets is removed to provide a surface onto which the spacer material 105 as well as a portion of the second membrane 115 are contacted and adhered. In this regard, the membrane 110 passes over and around a portion of a tensioning roller 29. On the bottom side of the tensioning roller 29, the first release sheet 47 is separated from the membrane 110 and routed to the take-up roll 27 where it is wound at a rate equal to the membrane's travel through the apparatus 1. The removal of the release sheet 47 exposes one entire adhesive surface of the membrane 110. After release sheet removal, the membrane 110 continues toward the drive roller 5 and the inlet nip 6. The membrane's second release sheet 112 (see FIG. 1) contacts the surface of the drive roller 5 such that the membrane's exposed adhesive surface is oriented outward on the drive roller 5 at the inlet nip 6.

The third spindle 20 holds a length of a membrane 115 that contains a single adhesive surface. Initially, this entire adhesive surface is covered by release sheet 117. In order to contact a portion of this adhesive surface to the first membrane 110 to form the air and moisture barrier assembly 100, a portion of the release sheet 117 must be removed. FIG. 5 shows a release sheet cutting means 50 utilized to remove a portion of the release sheet 117. The release sheet cutting means 50 contains a carrier bar 52, a blade 54, and an adjustable holder 56. During operation of the apparatus 1, the second membrane 115 moves in the direction shown by the large arrow in FIG. 5. That is, the membrane 115 is drawn off the supply drum 20 and passes over tensioning bar 24. Mounted directly above tensioning bar 24 is the release sheet cutting, means 50. The release sheet cutting means has a carrier bar 52 that is mounted parallel with the tensioning bar 24 and perpendicular to the second membrane 115. The carrier bar 52 supports an adjustable holder 56 which in turn supports a cutting blade 54. The adjustable holder 56 may be selectively positioned along the length of the carrier bar 52 so the blade 54 may cut the release paper 117 at any point across the width of the membrane 115. Further, the adjustable holder 56 allows adjustment of the blade depth. In this regard, the blade 54 may be adjusted such that it 'scores' or cuts most or all the way through the release sheet 117 without damaging the underlying membrane 115. As will be appreciated, the blade 54 is mounted directly above tensioning roller 24, which provides a firm surface for cutting.

During operation of the apparatus 1, the second membrane 115 travels in the direction shown by the large arrow in FIG. 5 which draws the blade 54 through the release sheet 117 and leaves a cut line 58 in the release sheet 117. Once the membrane 115 passes under the second tensioning bar 25, the "cut" portion 34 of the release sheet 117 is routed up to the take-up roll 26. The tensioning bar 25 provides a removal point for removing the cut portion. 34 of the release sheet 117 from the adhesive layer 51 while preventing a pulling force from being applied to the section of the release sheet 117 currently under the blade 54. The take-up roll 26 rotates at a speed equal to that of the travel of second membrane 115 so the cut portion 34 of release sheet 117 is removed simultaneously with the operation of the apparatus 1. As shown, after the second membrane 115 has passed the second tensioning roller 25, a first portion 130 of this second membrane 115 has an exposed adhesive surface 51, while a second portion 132 remains covered by the release sheet 117.

Figure 6:
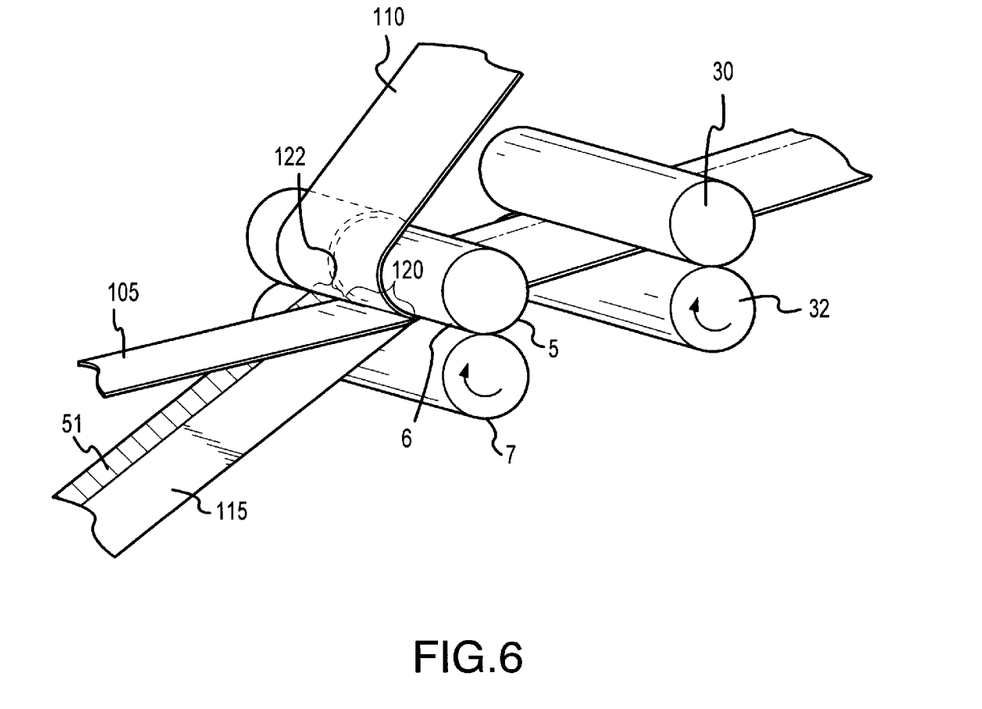
FIG. 6 shows the orientation of the membranes and spacer material as they pass through the compression rollers of the apparatus of FIG. 3.

The second supply spindle 15 (FIG. 3) contains a supply roll of the spacer material 105. The spacer material 105 passes underneath tensioning roller 18 so that it is properly oriented at the inlet nip 6 for contact with the two membranes 110, 115. Referring to FIG. 6, the orientation of the two membranes 110, 115 and spacer material 105 is shown as they enter the inlet nip 6 of the first set of rollers 5, 7. As shown, a lateral edge of the first membrane 110 and a lateral edge 106 of the spacer material 105 are aligned. Further, the top surface of the spacer material 105 is contacted with a first portion 120 of the first membrane 110, which as noted above is an exposed adhesive surface. This laminates the spacer material 105 to the first membrane 110. Simultaneously a second portion 122 of the first membrane 110 is contacted with the exposed adhesive 51 surface of the second membrane 115. The section of the second membrane 115 that is still covered by release sheet 117 is compressed against the bottom face of the spacer material 105. As will be appreciated, the release sheet 117 prevents the spacer material 105 and second membrane 115 from being laminated together, allowing the assembly 100 to be unfolded to attain the "T"-shaped cross section. The resulting laminate passes through the second set of rollers 30, 32 in this folded configuration. Though the second set of rollers 30, 32 apply a second compressive force to the laminate, the main function of this set of rollers 30, 32 is to maintain alignment of the laminate structure at the first set of rollers 5,7. The laminate is then wound on a laminate take-up roll (not shown).

Although the present invention has been described with respect to specific embodiments thereof, various changes and modifications may be suggested to one skilled in the art and it is intended that the present invention encompass such changes and modifications as fall within the scope of the intended claims.

What is claimed is:

1. An apparatus for making an air and moisture barrier laminate assembly for sealing the interface between a sill plate and a foundation wall, said apparatus comprising:

first and second rollers positioned in a parallel opposed relationship to one another to define an inlet nip and an outlet nip, said rollers operative to rotate in a cooperative manner;

means for controllably turning at least one of said rollers;

a first holder for holding a length of a first membrane having a surface adapted for securement to a foundation wall, said holder operative to hold said first membrane in a first position relative to said inlet nip;

a second holder for holding a length of a spacer material of a predetermined thickness, said holder holding said spacer material in a second position relative to said inlet nip;

a third holder for holding a length of a second membrane having a surface adapted for securement to a sill plate, said holder operative to hold said second membrane in a third position relative to said inlet nip; and said first and second rollers further operative to simultaneously receive and contact said first membrane, said spacer material and said second membrane at said inlet nip in a known spaced relationship and apply a predetermined compressive force thereto.

2. The apparatus of claim 1, wherein at least one surface of each of said first and second membranes is coated by a bitumen containing material, said bitumen containing material imparting adhesive and waterproofing qualities to said surface, wherein said bitumen coating is initially covered by a peel-away release sheet.

3. The apparatus of claim 2, wherein said first membrane contains first and second surfaces coated with a bitumen containing material, wherein said first surface is adapted for adhesive securement to said foundation wall upon removal of said release sheet and a said second surface is adapted to be adhesively laminated to said spacer material and said second membrane.

4. The apparatus of claim 3, wherein said first membrane has a width between about 4 inches and about 12 inches, wherein a first portion of said width is sized for engaging a top surface of said foundation wall and a second portion of said width is sized for engaging a side surface of said foundation wall.

5. The apparatus of claim 4, wherein said first membrane has a width of between about 6 inches and 10 inches, wherein a first portion of said width is sized for engaging a top surface of said foundation wall and a second portion of said width is sized for engaging a side surface of said foundation wall.

6. The apparatus of claim 2, wherein at least a portion of said second membrane bitumen coating is adapted for adhesive securement to said sill plate upon removal of said release sheet.

7. The apparatus of claim 6, wherein said second membrane has a width of between about 3 inches and 8 inches, wherein a first portion of said width is sized for attachment to a portion of said first membrane and a second portion of said width is sized for engaging a side surface of said sill plate.

8. The apparatus of claim 2, further comprising means to continually remove at least a portion of said release sheet covering said bitumen coating on at least one of said first membrane and said second membrane prior to said membrane being received at said inlet nip.

9. The apparatus of claim 8, wherein said means to remove comprises at least one of:

a cutter for cutting through said release sheet at a selectable distance across the width of said membrane; and a take-up roll operative to wind at least a portion of said release sheet from said bitumen coating prior said membrane being received at said inlet nip.

10. The apparatus of claim 1, wherein said spacer material predetermined thickness is between about ¼ of and inch and 2 inches, said predetermined thickness chosen for sealing gaps between said sill plate and said foundation wall.

11. The apparatus of claim 10, wherein said spacer material has a width between about 2 inches and 8 inches, said width sized for lamination onto at least a portion of said first membrane and placement between said sill plate and said foundation wall.

12. The apparatus of claim 11, wherein said spacer material has a width of between 3.5 inches and 5.5 inches.

13. The apparatus of claim 1, wherein said first second and third holders are spaced to allow first and second rollers to receive said first membrane, said spacer material and said second membrane at said inlet nip wherein said spacer, wherein said spacer material is laminated onto a first portion across the width of said first membrane and said second membrane is laminated onto a second portion across the width of said first membrane.

14. The apparatus of claim 1, wherein at least one of said first, second and third holders comprises a spindle for axially receiving a length of said respective materials, said holder operable to accommodate materials of varying widths.

15. The apparatus of claim 14, wherein said spindle further comprises a tensioner for exerting a resistive force to the rotation of a material contained thereon.

16. The apparatus of claim 1, wherein said means for controllably turning said at least one roller comprises a variable speed motor operatively coupled with said at least one roller.

17. The apparatus of claim 1, wherein at least one of said first and second rollers is movable in relation to the other said roller allowing the distance between said first and second rollers to be selectively adjusted.

18. The apparatus of claim 17, wherein said adjustable roller allows, selective adjustment of said compressive force.

19. The apparatus of claim 18, wherein said predetermined compressive force comprises a force between about 20 pounds force and 40 pounds force per inch of width of said laminate passing through said first and second rollers.

20. The apparatus of claim 19, wherein predetermined compressive force comprises a force between about 30 pounds force per inch of width of said laminate passing through said first and second rollers.

21. The apparatus of claim 1, wherein at least one of said first and second rollers comprises a first portion along its longitudinal axis having a first diameter and a second portion along its longitudinal axis having a different second diameter.

22. The apparatus of claim 21, wherein said two-diameter roller is operative to apply first and second compressive forces to first and second portions across the width of said laminate passing between said two-diameter roller and said adjacent roller.

23. The apparatus of claim 1, further comprising a second set of rollers positioned adjacent to one another defining a second inlet nip and a second outlet nip and operative to rotate in a cooperative manner, wherein said second pair of rollers is oriented in a spaced relation with said first pair of rollers allowing said laminate exiting said outlet nip to be received in said second inlet nip.

24. The apparatus of claim 1, further comprising a take-up roll to controllably roll said laminate as said laminate exits said outlet nip.

25. A process for making an air and moisture barrier laminate for sealing the interface between a sill plate and a foundation wall, said process comprising:

provinding a length of a first membrane having a first adhesive surface sized for securement to said foundation wall;

providing a spacer material sized for compression between said foundation wall and said sill plate;

providing a second membrane having a first adhesive surface sized for interconnection to said first membrane and securement to said sill plate;

contacting said spacer material and said second membrane to first and second portions across the width of a second surface of said first membrane;

applying a compressive force to laminate said spacer material onto said first portion across the width of said first membrane and laminate said second membrane onto said second portion across the width of said first membrane.

26. The process of claim 25, wherein said applying step further comprises feeding said first membrane said spacer material and said second membrane through a pair of compressive rollers.

27. The process of claim 25, wherein said step of providing said first membrane further comprises, providing a membrane with a second adhesive surface for contacting said spacer material and said second membrane.

28. The process of claim 27, wherein said step of providing said first membrane further comprises removing a release sheet covering said second adhesive surface, wherein said adhesive surface is exposed.

29. The process of claim 28, wherein said step providing said second membrane further comprises removing at least a portion of a release sheet covering said adhesive surface, wherein at least a portion of said adhesive surface is exposed.

30. The process of claim 29, wherein said contacting step comprises contacting a face surface of said spacer material to a first portion of said of said first membrane's exposed adhesive surface while simultaneously contacting a portion of said second membrane to a second portion of said first membrane's exposed adhesive surface.

31. The process of claim 30, wherein said portion of said second membrane contacted to said first membrane is an exposed adhesive surface.

32. The process of claim 30, wherein said applying step comprises applying a first compressive force to said first portion of said of said first membrane while simultaneously applying a second compressive force to said second portion of said first membrane.

* * * * *